United States Patent
Ilo

(10) Patent No.: US 11,190,024 B2
(45) Date of Patent: Nov. 30, 2021

(54) METHOD FOR REGULATING A POWER SUPPLY SYSTEM

(71) Applicant: SIEMENS AKTIENGESELLSCHAFT, Munich (DE)

(72) Inventor: Albana Ilo, Pressbaum (AT)

(73) Assignee: Siemens Aktiengesellschaft, Munich (DE)

( * ) Notice: Subject to any disclaimer, the term of this patent is extended or adjusted under 35 U.S.C. 154(b) by 265 days.

(21) Appl. No.: 14/438,932

(22) PCT Filed: Oct. 30, 2012

(86) PCT No.: PCT/EP2012/071461
§ 371 (c)(1),
(2) Date: Apr. 28, 2015

(87) PCT Pub. No.: WO2014/067557
PCT Pub. Date: May 8, 2014

(65) Prior Publication Data
US 2015/0340870 A1    Nov. 26, 2015

(51) Int. Cl.
*H02J 4/00* (2006.01)
*H02J 3/06* (2006.01)
*H02J 3/38* (2006.01)

(52) U.S. Cl.
CPC .................. *H02J 4/00* (2013.01); *H02J 3/06* (2013.01); *H02J 3/382* (2013.01); *Y02E 60/00* (2013.01); *Y02P 80/10* (2015.11); *Y04S 10/126* (2013.01)

(58) Field of Classification Search
CPC ..... H02J 4/00; H02J 3/06; H02J 3/382; Y02E 60/721; Y04S 10/126

(Continued)

(56) References Cited

U.S. PATENT DOCUMENTS

| | | | |
|---|---|---|---|
| 7,526,366 B2 * | 4/2009 | Rehtanz | H02J 3/06 700/293 |
| 9,106,152 B2 | 8/2015 | De Brabandere et al. | |

(Continued)

FOREIGN PATENT DOCUMENTS

WO    2012031992 A2    3/2012

OTHER PUBLICATIONS

Liming Liu;""A Cascaded Photovoltaic System Integrating Segmented Energy Storages With Self-Regulating Power Allocation Control and Wide Range Reactive Power Compensation""; Power Electronics, IEEE Transaction on (vol. 26, Issue 12) Journals & Magazines pp. 3545-3559,ISSN 0885-8993, 2011, US.

(Continued)

*Primary Examiner* — Hal Kaplan
*Assistant Examiner* — Swarna N Chowdhuri
(74) *Attorney, Agent, or Firm* — Laurence A. Greenberg; Werner H. Stemer; Ralph E. Locher

(57) ABSTRACT

A method provides closed-loop control for an entire power supply system which has three supply levels each considered to be a separate regulatory unit and controlled independently of the other supply levels. An interface between two respective regulatory units is defined by control of the active power and reactive power transmitted between the two regulatory units. Appropriate control of the active power and reactive power transmitted between the regulatory units allows these regulatory units to be isolated from or connected to one another in terms of power. A power supply system is ideally regarded as a chain of separate regulatory units for supplying power. This allows efficient and safe operation and local control of a power supply system to which locally produced power is supplied, for example on different supply levels. In addition, a low number of data items to be interchanged between the supply levels is maintained.

8 Claims, 1 Drawing Sheet

(58) Field of Classification Search
USPC .......................................................... 307/24
See application file for complete search history.

(56) References Cited

U.S. PATENT DOCUMENTS

| | | | | |
|---|---|---|---|---|
| 2004/0264082 | A1* | 12/2004 | Suliman | H02J 3/381 361/62 |
| 2005/0034023 | A1* | 2/2005 | Maturana | G05B 15/02 714/37 |
| 2011/0106321 | A1* | 5/2011 | Cherian | H02J 13/00002 700/286 |
| 2012/0316691 | A1* | 12/2012 | Boardman | H02J 3/26 700/293 |
| 2013/0182477 | A1* | 7/2013 | De Brabandere | H02J 3/381 363/95 |
| 2013/0270902 | A1* | 10/2013 | Andersen | B60R 16/03 307/9.1 |
| 2014/0249688 | A1* | 9/2014 | Ansari | G05F 1/66 700/297 |

OTHER PUBLICATIONS

Xiongfei Wang et al.; Distributed Energy Resources in Grid Interactive AC Microgrids, Power Electronics for Distributed Generation System 9PEDG0, 2010 2nd IEEE International Symposium, pp. n806-n812, ISBN 978-1-4244-5669-7, Conference Publications, 2010, CN.

* cited by examiner

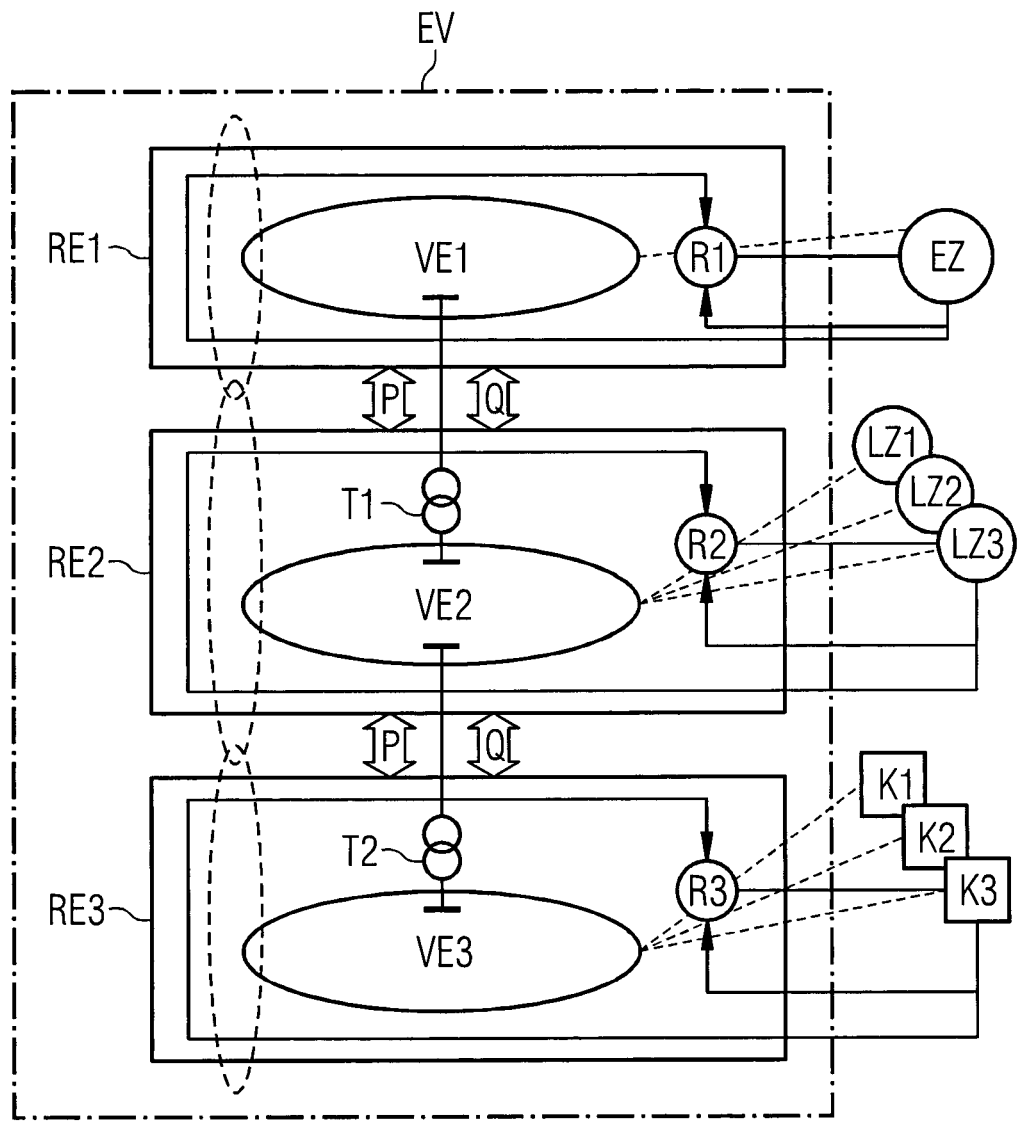

METHOD FOR REGULATING A POWER SUPPLY SYSTEM

TECHNICAL FIELD

The invention relates generally to the field of power grids. The present invention specifically relates to a method for regulating an entire power grid. Said power grid has three supply levels.

BACKGROUND ART

A power grid is usually understood as meaning a network of transmission lines in which physical processes can be described by what are known as Kirchhoff's laws, and by which energy or electricity is transported from energy producers (e.g. conventional power plant operators, etc.) and distributed to consumers (e.g. industrial concerns, homes, etc.). For this transportation, three supply levels which are in principle networks or network levels having different, defined voltage ranges are usually provided in a power grid. These supply levels are therefore classified according to the voltage range in which electrical energy is transmitted, and according to the corresponding distribution function. In a power grid there is usually a high-voltage or transmission level, a medium-voltage or primary distribution level, and a low-voltage or secondary (fine) distribution level.

The energy generated by the large producers such as e.g. large hydroelectric power plants, thermal power plants or large wind farms is fed in at the transmission level and transmitted to the distribution level e.g. via power transformers. Said transmission level is operated in an extra-high and high-voltage range, in Europe in particular in the range 60 kV (kilovolts) to 380 kV and higher. The electrical energy is usually distributed to regionally distributed transformer stations and/or large facilities such as e.g. hospitals, factories, etc. by the primary distribution level which is operated in a medium-voltage range (e.g. 1 kV to 60 kV). Said distribution level is generally fed from the higher-order supply level, the transmission or high-voltage level, via substations. For local (fine) distribution of the energy, the low-voltage or rather secondary distribution level is used, having a voltage range, e.g. in central Europe, of between approx. 230/400 volts up to 1000 volts. In other words, the energy is then transformed down from the primary distribution level to the voltage range of the secondary distribution level to supply e.g. private homes, smaller industrial facilities, etc.

Many of the power grids currently in operation were designed long ago—mainly more than fifty years ago—in respect of their structure and topology. These power grids mostly have a central or hierarchical structure in which the required energy is fed in at topmost supply level—i.e. at the transmission level—and conveyed from there to the lower supply levels—i.e. the primary and secondary distribution levels. The flow of energy is therefore always from one or more central generators (e.g. hydroelectric power plants, thermal power plants, etc.) to the consumers, which are usually connected to the lower two supply levels. At the highest supply level, i.e. the transmission level, automated regulation is usually performed and the entire grid is controlled by the consumption or rather demand at the lower two supply levels—i.e. the primary distribution level and the secondary distribution level.

However, in recent years the use of so-called renewable energy resources such as e.g. water power, wind energy, solar PV, etc. has become increasingly important because of different factors such as e.g. the limited reserves of the fossil fuels mainly used at the present time (e.g. coal, gas, oil), climate protection concerns, environmental issues, etc. The use of renewable energy resources is often associated with decentralized (distributed) power generation and supply in which electrical power is generated close to the consumer. The capacity of the power generating installations such as e.g. small hydroelectric power plants, small wind or solar farms or photovoltaic systems is generally designed to cover the energy needs of consumers in the immediate or relatively close proximity. In contrast to centralized power generation for which today's grids are still designed, in the case of decentralized generation the electrical energy is not only fed in at the high-voltage or transmission level, but can also be fed in via the medium-voltage or primary distribution level, e.g. from small power plants, and/or via the low-voltage or secondary distribution level, e.g. by means of photovoltaic systems.

However, alongside the advantage of preventing transformation losses, for example, decentralized power generation also has the disadvantage that energy production from wind power, solar energy and to a small extent also hydropower is much less plannable, e.g. because of weather-dependence, than e.g. power generation by means of conventional power plants. In addition, the power grids currently in operation are largely designed for energy transmission in one direction—i.e. from the transmission level via the primary distribution level and secondary distribution level to the consumers. If more energy is now generated on one of the lower supply levels such as the primary and/or secondary distribution level than is consumed on that supply level, this causes energy to flow in the opposite direction. This means that energy is fed back from the lower supply levels of the power grid. This can result in considerable problems for the operational safety and reliability of the power grid.

The publications Per Lund: "The Danish Cell Project—Part 1: Background and General Approach" IEEE Power Engineering Society General Meeting, June 2007 and N. Martensen, H. Kley, S. Cherian, 0. Pacific, Per Lund: "The Cell Controller Pilot Project: Testing a Smart Distribution Grid in Denmark", Grid Intertop 2009: The Road to an Interoperable Grid, Proceedings, 2009, 216-222 disclose a project that has been initiated and implemented by a Danish power grid operator. It attempted to solve the problems—associated primarily with the operating safety and reliability of the power grid—which result from a high proportion of decentralized power generation in the grid. The solution proposed in these publications involves restructuring or more specifically extending an existing structure of the power grid. In particular, the transmission level and the primary distribution level or rather their operators are more closely integrated via a separate management system—the so-called cell controller. This management system, i.e. the cell controller, acts as a kind of super management system by which decentralized energy generators can be coordinated, active and reactive power flows can be monitored, parts of the distribution level can be decoupled from the transmission level if necessary, and operators of the transmission and primary distribution level can therefore be jointly monitored, controlled and regulated. However, the disadvantage of using a management system of this kind is its complex architecture, possibly involving major and expensive disruption to the existing structure of the power grid. Moreover, it is questionable whether the use of such a management system is feasible at all for a relatively large power grid, as management is assumed centrally by a so-called cell controller. The publication WO 2012/008979

A2 also discloses a dynamic, distributed power grid control system. This control system enables dynamically distributed power generating installations to be controlled and regulated at the transmission and distribution level in a power grid. At the transmission and distribution level, the power grid is subdivided into regions. Each region is then assigned a regional control module by which the control and regulation of the regional part of the transmission and distribution level is monitored. In addition, each regional control module is connected to a plurality of local control modules to which the decentralized energy producers in the region are linked. Power generation and consumption are monitored and analyzed by a superordinate central control module in order to keep supply and demand in balance in the power grid. In addition, an energy flow to particular nodes in the power grid is monitored and analyzed by the different control modules in order to initiate appropriate steps and measures for grid safety and grid reliability if particular system parameters are exceeded. The system disclosed in WO 2012/008979 A2 also has the disadvantage of a very complex and costly architecture, as a large number of control modules must be incorporated into the power grid. In addition, the modules must be installed at great expense in the power grid, and adequate control involves monitoring and evaluating a large number of system parameters at different points in the grid.

A disadvantage common to the two systems disclosed in the respective publications is that they do not enable energy which is generated and fed in decentrally at the secondary distribution level, i.e. low-voltage level, to be controlled and regulated.

SUMMARY OF THE INVENTION

The object of the invention is therefore to specify a method for controlling an entire power grid and providing a simple and efficient means of decentrally controlling and regulating different supply levels of an entire power grid without major cost/complexity and taking account of an existing grid topology.

This object is achieved by a method of the kind mentioned in the introduction, having the features as claimed in the independent claim. Advantageous embodiments of the present invention are described in the dependent claims.

The object is inventively achieved using a method of the kind mentioned in the introduction, in which each of the three supply levels is regarded as an independent regulating unit and can therefore be regulated independently. An interface between two regulating units is defined by control of the active power and reactive power transmitted between the two regulating units.

The main aspect of the inventive solution proposed is that the power grid is considered in its totality and each of the supply levels is seen as an independent regulating unit. Consequently, the individual supply levels of the entire power grid can be understood as links in a chain which can interact flexibly with one another at points of contact by controlling the active power and reactive power. In particular, a middle or second supply level of the three supply levels in the power grid acquires a central, strategic position, because this supply level has interfaces with the two other supply levels. The method according to the invention provides a simple means of taking into account or rather integrating decentralized power generation at each supply level, without major modification of the structure of the power grid. This also enables a power grid to be both operated efficiently and safely and controlled decentrally, as it is possible to react very simply to different events (e.g. overload, etc.) at one or more supply levels in real time.

It is also advantageous if, for each regulating unit, a voltage range predefined for the respective regulating unit is maintained. For the supply levels or rather regulating units, voltage ranges such as e.g. high voltage, medium voltage or low voltage can be predefined, for example, by various international and/or national standards. These voltage ranges are then monitored and controlled in a very simple manner for the respective regulating unit and it is also ensured that these ranges are maintained by the respective regulating unit in spite of decentralized energy feed-in.

For controlling an individual regulating unit, it is also advantageous if primary control, secondary control and tertiary control are used. By means of the method according to the invention, each supply level is considered separately as an independent regulating unit—this means a control field is limited to the respective supply level. Each of the supply levels of the power grid has per se the same control scheme. In other words, fluctuations between feed-in and removal of energy is equalized by each regulating unit itself in the short term by the regulating unit e.g. increasing or reducing energy intake.

Primary control involves in particular equalizing imbalances between supply and demand within the respective supply level, i.e. for the respective regulating unit. In other words, the respective generators of the respective supply level are controlled accordingly. These are e.g. the large power generators (e.g. large hydroelectric power plants, thermal power plants, etc.) at a first supply level, i.e. transmission level. At a second supply level supply, i.e. distribution level, the decentralized power generators (e.g. small hydroelectric power plants, wind turbines, etc.) by which power is fed in at this level are controlled as the object of primary control. At a third supply level, i.e. low-voltage level, customer systems such as e.g. private photovoltaic installations are subject to primary control. The aim of primary control is to establish a stable line frequency.

At each supply level or rather within each regulating unit of the method according to the invention, secondary control seeks to restore the balance between electricity supply and demand when a difference arises in that regulating unit. In contrast to primary control, the situation within the respective regulating unit including power exchange with the other regulating units is considered here. For this purpose the respective power flows (active and reactive power) at the respective interfaces between the regulating units are considered. For example, by monitoring the line frequency, care is taken to ensure that primary and secondary control always operates in the same flow direction.

In the case of tertiary control or so-called minute reserve, energy or rather power reserves—in particular according to corresponding demand—are provided in or rather for the respective regulating unit. A distinction can be made between a positive and negative control energy. In the case of a so-called positive minute reserve or rather control energy, an energy underproduction is absorbed in the respective control element. By a negative minute reserve or rather control energy is usually meant the capacity which is required for storing or holding back energy if there is too much energy and too little demand in the respective regulating unit. With the method according to the invention it is also advisable for control values, in particular values for the reactive power, the active power and/or the so-called power factor, to be exchanged across the interface between the regulating units. This minimizes transmission and evaluation of control values between the regulating units, i.e.

supply levels, for appropriate control. In the case of a conventional distribution facility in a European power grid, up to 500 data items or control values are typically exchanged between transmission and distribution level. The method according to the invention makes it possible, for example, to keep the voltage within the respectively predefined ranges for the regulating units (e.g. transmission level, distribution level) by transmitting only reactive power, active power and/or the so-called power factor. This provides a simple means of significantly reducing the number of data items and/or control values to be transmitted between the supply levels.

In an advantageous further development of the invention it is provided that, by reducing the active power and reactive power transmitted between the respective regulating units at the interface between said regulating units, the regulating units can be separated and then operated independently of one another. The method according to the invention provides a very simple means of forming so-called "microgrids" or stand-alone systems. By reducing the active power and reactive power transmitted at the interface between the respective regulating units, one regulating unit can be separated from the other regulating unit and act as a so-called stand-alone system. Thus, for example, the distribution level as an independent regulating unit can be e.g. temporarily decoupled from the transmission level and act as a stand-alone system. A stand-alone system is a form of power distribution which often consists of just one or a small number of smaller energy suppliers (e.g. small hydroelectric power plants, wind farm, etc.) by which a defined area is supplied with energy. During the period of decoupling, the regulating unit then has no connection e.g. to the transmission levels of the power grid.

For reconnection of regulating units (e.g. stand-alone systems, etc.) to another regulating unit (e.g. transmission level, etc.) the method according to the invention ideally provides that synchronization between the regulating units to be connected is first carried out. The active and reactive power transmitted between the regulating units to be connected at the interface between said regulating units is then increased.

It is also advantageous if a high-voltage or transmission level is provided as the first of the three supply levels. A medium-voltage or distribution level can be provided as the second of the three supply levels, and a low-voltage or secondary distribution level can be provided as the third of the three supply levels. The supply levels are normally provided in power grids and are ideally regarded as independent regulating units by the method according to the invention. Each supply level is seen by the other supply levels as a so-called "black box". Interaction between the respective supply levels takes place very simply via the respective interface by appropriate control of the active and reactive power, wherein the active and reactive power can be transmitted in both directions.

BRIEF DESCRIPTION OF DRAWINGS

The invention will now be explained using examples with reference to the accompanying drawing. The FIGURE schematically illustrates a typical power grid in which the method according to the invention is used to control an entire power grid.

DESCRIPTION OF EMBODIMENTS

The FIGURE of the drawing schematically illustrates a typical power grid EV. This power grid EV has three supply levels VE1, VE2, VE3. A high-voltage transmission level is provided as the topmost or first supply level VE1. A second or middle supply level VE2 is implemented as a medium-voltage distribution level and a low-voltage or secondary distribution level is provided as the third or lowest supply level.

At each of these three supply levels VE1, VE2, VE3, energy is fed into the power grid EV decentrally via respective typical power generators EZ, LZ1, LZ2, LZ3, K1, K2, K3 at the respective supply level VE1, VE2, VE3. At the first supply level, i.e. the transmission level VE1, energy produced by large power generators EZ such as e.g. large hydroelectric power plants, thermal power plants or large wind farms is fed into the power grid. As well as larger consumers (e.g. factories, hospitals, etc.), regional or local power generators LZ1, LZ2, LZ3 such as e.g. small hydroelectric power plants, wind farms, etc. can also be connected to the second supply level or more specifically the primary distribution level. Decentrally generated power is then fed into the power grid by these regional or local power generators LZ1, LZ2, LZ3. Private homes, small industrial facilities, etc. are usually connected to the power grid EV as consumers at the lowest supply level or secondary distribution level VE3. However, energy can also be fed into the power grid EV at the third supply level VE3 by private power generators K1, K2, K3 such as e.g. photovoltaic systems, etc.

Each of the three supply levels VE1, VE2, VE3 is regarded by the method according to the invention as a self-contained regulating unit RE1, RE2, RE3 which is controlled independently. Each regulating unit RE1, RE2, RE3 has the same control scheme R1, R2, R3 and primary control, secondary control and tertiary control are used for controlling the respective regulating unit RE1, RE2, RE3. For the respective regulating unit RE1, RE2, RE3, different objects therefore emerge for R1, R2, R3 control. At the first supply level VE1 constituting a first regulating unit RE1, in particular the large power generators are controlled. At the second supply level VE2 representing a second regulating unit RE2, the object of R2 control, in particular of primary control, are particularly the decentralized (regional and/or local) power generators LZ1, LZ2, LZ3. At the third supply level VE3 constituting a third regulating unit RE3, power is generated and fed in e.g. by private producers K1, K2, K3 whereby these customer systems (e.g. photovoltaics, etc.) must be controlled accordingly at the third supply level VE3.

According to the inventive method for controlling the power grid EV, an interface between two regulating units RE1, RE2, RE3 is then defined by control of an active power P and a reactive power Q transmitted between said two regulating units RE1, RE2, RE3. In the power grid EV illustrated by way of example, an interface is therefore defined by control of the active power P and reactive power Q between the first and the second regulating unit RE1, RE2—and therefore between the transmission level VE1 and the primary distribution level VE2. In addition, an interface is formed via the control of active power P and reactive power Q between the second and third regulating unit RE2, RE3, i.e. the primary distribution level VE2 and the secondary distribution level VE3. Consequently, the supply levels VE1, VE2, VE3, i.e. the regulating units RE1, RE2, RE3 can interact flexibly as links in a chain by the control of the active power P and reactive power Q at the respective interfaces, wherein the second regulating unit RE2, i.e. the primary distribution level VE2 because of its position—it has interfaces with the two other supply levels VE1, VE2—can be seen as a central, strategic link in the chain. The respective regulating unit RE1, RE2, RE3 thus represents for the other regulating units RE1, RE2, RE3 a so-called "black box" and only a very small amount of data or control values are exchanged across the interface between the regulating units RE1, RE2, RE3. Thus, only values for the reactive power Q and/or the active power P and/or a value for the so-called power factor cos φ are exchanged e.g. between the first regulating unit RE1, i.e. the transmission level VE1, and the second regulating unit RE2, i.e. the primary distribution level VE2, e.g. for maintaining voltage ranges predefined for the supply level VE1, VE2.

In addition, each regulating unit RE1, RE2, RE3, i.e. each supply level VE1, VE2, VE3, can have a predefined voltage range which shall be maintained by the respective regulating unit. The first regulating unit RE1 or rather the transmission level VE1 is operated e.g. in an extra-high-voltage and high-voltage range (e.g. 60 to 380 kV and possibly even higher). In the second regulating unit RE2, i.e. the primary distribution level VE2, a medium-voltage range (e.g. 1 to 60 kV) can be maintained, for example. For fine distribution of energy, the third regulating unit RE3, i.e. the secondary distribution level VE3, can be operated in a low-voltage range e.g. between approx. 230/400 volts.

For voltage transformation of energy between the supply levels VE1, VE2, VE3, appropriate transformation stations T1, T2 are therefore provided. For this purpose the second regulating unit RE2 or rather supply level VE2 has, for example, a first transformation station T1 (e.g. electrical substation, etc.). At the third supply level VE3 or rather in the third regulating unit RE3 a second transformation station T2 (e.g. transformer, etc.) is provided for this purpose.

By controlling the active power P and reactive power Q transmitted between the regulating units RE1, RE2, RE3, so-called microgrids or stand-alone systems can also be very easily created or rather reincorporated into the power grid EV. For example, the second regulating unit RE2, i.e. the second supply level VE2, can be (temporarily) disconnected from the first regulating unit RE1 or rather the transmission level VE1 jointly with the third regulating unit RE3, because sufficient energy is being produced e.g. by the regional or local generators LZ1, LZ2, LZ3 to meet the demand of the second and third supply level VE2, VE3. Transmission of the active power P and the reactive power Q via the interface between the first and the second regulating unit RE1, RE2 is reduced to zero. The first and second supply levels VE1, VE2 are then still synchronized, but no more power P, Q is transmitted between them. Then once the corresponding first transformation station T1 has been disconnected, the two supply levels VE1, VE2 or rather the two regulating units RE1, RE2 are separated from one another. The second regulating unit is then operated as a microgrid or stand-alone network.

For reconnection of the second regulating unit RE2 to the first regulating unit RE1, i.e. to the transmission level VE1, because, for example, the energy demand can no longer be covered locally/regionally, synchronization between the first regulating unit RE1 and the second regulating unit RE2 to be connected is first carried out. The active power P and reactive power Q to be transmitted between the regulating units RE1, RE2 is then increased so that power P, Q can again be exchanged between the regulating units RE1, RE2.

A power grid EV is regarded by the method according to the invention and as a kind of energy supply chain in which the individual regulating units RE1, RE2, RE3 or rather links in the chain can interact with one another in a simple and flexible manner. This enables decentralized power generators LZ1, LZ2, LZ3, K1, K2, K3 to be very easily integrated into an existing power grid EV.

The invention claimed is:

1. A method for closed-loop control of an entire power grid, the power grid having three voltage supply levels, each of the three voltage supply levels having a predefined voltage range and each of the three voltage supply levels being connected to another one of the three voltage supply levels by at least one interface, the method comprising:
   independently controlling each of the three voltage supply levels with respect to other ones of the three voltage supply levels by using a primary control, a secondary control, and a tertiary control, wherein the independently controlled three voltage supply levels result in three regulating units that are each controlled independently with respect to other ones of the three regulating units; and
   defining an interface between two of the three regulating units by control of an active power and a reactive power transmitted between the two regulating units.

2. The method according to claim 1, which comprises maintaining, for each of the three regulating units, a voltage range that is predefined for the respective regulating unit.

3. The method according to claim 1, which comprises exchanging control values via the interface between the two regulating units.

4. The method according to claim 3, wherein the control values are selected from the group consisting of values for the reactive power, the active power, and/or a power factor.

5. The method according to claim 1, which comprises separating the two regulating units by reducing the active power and reactive power transmitted between the two regulating units at the interface thereof.

6. The method according to claim 5, which comprises, for reconnecting the two regulating units, first synchronizing the two regulating units to be connected to one another, and then increasing the active power and reactive power transmitted between the two regulating units to be connected to one another at the interface between the two regulating units to be connected to one another.

7. The method according to claim 1, which comprises defining a first of the three supply levels as a high-voltage or transmission level, a second of the three supply levels as a medium-voltage or primary distribution level, and a third of the three supply levels as a low voltage or secondary distribution level.

8. The method according to claim 7, which comprises operating the regulating unit of the primary distribution level as a stand-alone system by decoupling the primary distribution level from the transmission level and from the secondary distribution level.

* * * * *